United States Patent
Fukumasa

(10) Patent No.: US 7,031,370 B1
(45) Date of Patent: Apr. 18, 2006

(54) SPREAD-SPECTRUM COMMUNICATION DEVICE

(75) Inventor: Hidenobu Fukumasa, Higashihiroshima (JP)

(73) Assignee: Sharp Kabushika Kaisha, Osaka (JP)

( * ) Notice: Subject to any disclaimer, the term of this patent is extended or adjusted under 35 U.S.C. 154(b) by 0 days.

(21) Appl. No.: 09/914,009

(22) PCT Filed: Feb. 29, 2000

(86) PCT No.: PCT/JP00/01162

§ 371 (c)(1),
(2), (4) Date: Aug. 22, 2001

(87) PCT Pub. No.: WO00/52843

PCT Pub. Date: Sep. 8, 2000

(30) Foreign Application Priority Data

Mar. 1, 1999 (JP) .............................. 11/053346

(51) Int. Cl.
*H04B 1/707* (2006.01)
(52) U.S. Cl. ..................... 375/141; 375/146
(58) Field of Classification Search ................ 375/130, 375/135, 136, 140, 146, 147, 150
See application file for complete search history.

(56) References Cited

U.S. PATENT DOCUMENTS

| | | | | |
|---|---|---|---|---|
| 5,280,537 A | * | 1/1994 | Sugiyama et al. | 370/527 |
| 5,796,776 A | * | 8/1998 | Lomp et al. | 375/222 |
| 6,031,865 A | * | 2/2000 | Kelton et al. | 375/130 |
| 6,222,873 B1 | * | 4/2001 | Bang et al. | 375/146 |
| 6,252,899 B1 | * | 6/2001 | Zhou et al. | 375/140 |
| 6,359,875 B1 | * | 3/2002 | Hamada et al. | 370/342 |
| 6,363,106 B1 | * | 3/2002 | Popovic et al. | 375/150 |
| 6,377,539 B1 | * | 4/2002 | Kang et al. | 370/209 |
| 6,393,047 B1 | * | 5/2002 | Popovic' | 375/140 |
| 6,549,564 B1 | * | 4/2003 | Popovic | 375/146 |

FOREIGN PATENT DOCUMENTS

| | | |
|---|---|---|
| EP | 783210 | 7/1997 |
| EP | 921652 | 6/1999 |
| GB | 2 300 545 | 11/1996 |
| JP | 5-235894 | 9/1993 |
| JP | 6-232838 | 8/1994 |
| JP | 9-46271 | 2/1997 |
| JP | 9-153883 | 6/1997 |
| WO | WO 98/52365 | 11/1998 |

OTHER PUBLICATIONS

EP Search Report dated Jun. 14, 2004.

(Continued)

*Primary Examiner*—Betsy L. Deppe
(74) *Attorney, Agent, or Firm*—Nixon & Vanderhye, PC

(57) ABSTRACT

An example spread spectrum communication system is provided in which a transmission signal is separated into an I-phase component and a Q-phase component. In a complex spreading portion, spreading is performed by using multipliers and adders together with a sequence pattern of 1 and −1 appearing alternately. The outputs from the complex spreading portion are modulated in multipliers using pseudo-random sequences $PN^{(k)}(x)$ allotted for individual users. The baseband signal undergoes waveform shaping by roll-off filters and is modulated through a carrier modulator, then sent to a power amplifier, where it is amplified and transmitted via an antenna.

21 Claims, 8 Drawing Sheets

OTHER PUBLICATIONS

Bang, S. et al., "A Spectrally Efficient Modulation and Spreading Scheme Using Orthogonal Channelization and Rotator", The 3rd CDMA International Conference & Exhibition; Technology for the Next Millenium; vol. II; Seoul Korea; Oct. 27-30, 1988; pp 100-105.

*Global CDMA II for IMT-2000 RTT System Description*, Verison 1.0, TTA, Korea, Jun., 1998, pp. 12-14.

Ojanperä et al., *An Overview of Air Interface Multiple Access for IMT-2000/UMTS*, IEEE Communications Magazine, Sep. 1998, pp. 82-86, 91-95.

* cited by examiner (a) In the case of QPSK spreading (b) In the case of OCQPSK spreading (c) In the case of the first embodiment Signal points in the
first embodiment Signal points in the
second embodiment

SPREAD-SPECTRUM COMMUNICATION DEVICE

This application is the national stage of PCT/JP00/01162, filed Feb. 29, 2000, which designates the United States.

TECHNICAL FIELD

The present invention relates to a spread spectrum communication system based on the direct sequence spreading scheme, for a portable phone and mobile communication system, for example.

BACKGROUND ART

In recent years, research and development as to mobile communication systems using the spread spectrum technology based on the direct sequence spreading scheme have been extensively made. Such communication systems include a system used worldwide and known as cdmaone, and the W-CDMA system and the Wideband cdmaOne (cdma2000) system which both are aiming at the standard for IMT-2000 (see Tero Ojanperä and Ramjee Prasad, "An Overview of Air Interface Multiple Access for IMT-2000/ UMTS", IEEE Communications Magazine, September 1998. etc.). Among these, particularly for the W-CDMA, use of roll-off filters having small roll-off ratios is demanded in order to reduce the required bandwidth as small as possible relative to the chip rate. As the spread spectrum communication system for this scheme, a method combined with QPSK(quadri-phase shift keying) has been proposed.

FIG. 1 shows a block diagram of a transmitter of this spread spectrum communication system of the QPSK scheme. The transmitter of this spread spectrum communication system is comprised of a complex spreading portion 701 for performing complex spreading modulation of data $D_j$ and $D_q$ which are the I-phase component(in-phase component) and the Q-phase component(quadrature-phase component) of the transmission signal, roll-off filters 708 and 709, a carrier modulator 716, a power amplifier 715 and an antenna 717.

Complex spreading portion 701 includes multipliers 702 to 705 for multiplying the I-phase and Q-phase data by complex number sequences $W_0$ and $W_1$ and adders 706 and 707 each performing addition of the I-phase and Q-phase data modulated by $W_0$ and $W_1$.

Carrier modulator 716 includes a sinusoidal wave generating circuit 710, a phase-rotation circuit 713 for rotating the phase of the sinusoidal wave by $\pi/2$, a multiplier 711 for modulating the data having passed through roll-off filter 708 by the sinusoidal wave and a multiplier 712 for modulating the data having passed through roll-off filter 709 by the sinusoidal wave rotated in phase by $\pi/2$, and an adder 714 for performing addition of these pieces of modulated data.

However, since the signal wave forms having passed through the roll-off filters present large dynamic ranges, a spread spectrum communication system of this type may be demanded high linearity for a power amplifier and other circuits.

To deal with the problem of this kind, Japanese Patent Publication Hei 7 No. 312391 discloses a spread spectrum transmitter/receiver in which spectrum spreading and a $\pi/4$ shift QPSK are applied in combination. In this $\pi/4$ shift QPSK, since the positions of the signal points of sequential symbols differ in phase by $\pi/4$ from each other, the envelop will not cut the point '0' when the signal transits from one signal point to another, so that the variations of the envelop is known to be small. This effect can be similarly obtained when it is applied to a spread spectrum scheme.

On the other hand, as found in 'Global CDMA II for IMT-2000 RTT System Description' TTA, Korea (Jun. 17, 1998), a special spreading scheme based on the combination of pseudo-random sequence and Walsh sequence has been also proposed. Now, this scheme is called OCQPSK(orthogonal complex QPSK) and the block diagram is shown in FIG. 2.

The transmitter for the spread spectrum communication system based on this OCQPSK scheme is comprised of multipliers 802 and 803 for modulating the I-phase and Q-phase data $D_i$ and $D_q$ by Walsh sequences $W_0$ and $W_2$, respectively, a complex spreading portion 801 for performing complex spreading modulation, multipliers 810 and 811 for scrambling the data with pseudo-random sequences $PN^{(k)}$, roll-off filters 812 and 813, a carrier modulator 820, a power amplifier 819 and an antenna 821.

Complex spreading portion 801 includes multipliers 804 to 807 for multiplying the I-phase and Q-phase data modulated by $W_0$ and $W_2$ by complex number sequences $W_0$ and $W_1$, and adders 808 and 809 each performing addition of the I-phase and Q-phase data modulated by $W_0$ and $W_1$.

Carrier modulator 820 includes a sinusoidal wave generating circuit 814, a phase-rotation circuit 817 for rotating the phase of the sinusoidal wave by $\pi/2$, a multiplier 815 for modulating the data having passed through roll-off filter 812 by the sinusoidal wave and a multiplier 816 for modulating the data having passed through roll-off filter 813 by the sinusoidal wave rotated in phase by $\pi/2$, and an adder 818 for performing addition of these pieces of modulated data.

In this spread spectrum communication system, the I-phase data $D_i$ and Q-phase data $D_q$ are modulated by Walsh sequences $W_0$ and $W_2$ and further processed through complex spreading portion 801 where the signals are subjected to complex spreading modulation using complex number sequences made up of $W_0$ and $W_1$. Further, the output signals are scrambled by a pseudo-random sequence $PN^{(k)}$ uniquely allotted to the user. The signals are then passed through the roll-off filters and are processed through carrier modulating portion 820, where the signals are carrier-modulated to be output to power amplifier 819. This method has the feature of limiting the phase transition of the signal to reduce the amplitude variation of the signal by performing spread modulation using complex number sequences made up of Walsh sequences.

The method disclosed by Japanese Patent Publication Hei 7 No. 312391 is able to improve the characteristic compared to the QPSK spreading modulation, however, the degree of the improvement is not so large and hence is not large enough to meet the conditions required by W-CDMA.

The OCQPSK scheme is able to provide a certain degree of improvement, however, this is not good enough. That is, the reason why the OCQPSK cannot produce high enough improvement is that the Q-phase data $D_q$ is spread modulated by codes represented by $W_2$ or that the signal is varied in phase by units of 90 degrees every two chips when the signal is input to complex spreading portion 801 shown in FIG. 2. Since the restriction on phase transition is effective only when the phase of the symbol does not vary, the effect of restriction on phase transition is limited to one of two transitions, thus sharp improvement of the characteristics cannot be obtained.

It is therefore an object of the present invention to provide a spread spectrum communication system in which the requirement on the linearity for the amplifier etc. can be alleviated by inhibiting the amplitude variations of the signal more tightly than the above schemes, thus allowing for use of a compact, low-cost and energy saving transmitter.

DISCLOSURE OF INVENTION

Example embodiments of the present invention is configured as follows:

A first aspect of the invention is a spread spectrum communication system including a transmitter and receiver for performing spread spectrum communications based on a direct sequence spreading scheme and is characterized in that the transmitter includes: a complex spread portion for multiplying an I-phase component signal and a Q-phase component signal of the transmission signal by one type of complex number sequence which will not cause any phase transition of a signal on the I-Q plane in the direction toward the origin; a multiplier for multiplying the signals output from the complex spreading portion by a pseudo-random sequence which is generated at a speed exceeding the symbol rate; a roll-off filter for waveform shaping; and a carrier modulator for performing carrier modulation of the signals having undergone waveform shaping, and that the receiver includes: a carrier demodulator for performing carrier demodulation of the received signal; a multiplier for multiplying the two types of signals output from the carrier demodulator by the pseudo-random sequence generated at the same speed as above; a complex despreading portion for performing despreading by multiplying each signal by the complex number sequence; and a phase-correcting portion for performing phase-correction so as to extract the I-phase and Q-phase components.

A second aspect of the invention is characterized in that the complex spreading portion includes: a multiplier for multiplying the I-phase component signal and Q-phase component signal of the transmission signal by the complex number sequence; and an adder for performing addition of the I-phase component signal and Q-phase component signal of the transmission signal respectively to the Q-phase component signal and I-phase component signal multiplied by the complex number sequence, and that the complex despreading portion wherein the complex despreading portion performs the despreading includes: a multiplier for multiplying the signals by the complex number sequence; and an adder for performing addition of the signals to the signals multiplied by the complex number sequence, respectively.

A third aspect of the invention is characterized in that the complex number sequence is a pattern in which the I-phase component is constantly set at 1 or −1 and the Q-phase component changes between 1 and −1 alternately.

A fourth aspect of the invention is that the spectrum spread communication system defined in any of the first through third aspects, further includes: a mapping circuit disposed prior to the transmitter for mapping the multiplexed transmission signals to points on the I-Q plane.

A fifth aspect of the invention is a spread spectrum communication system including a transmitter and receiver for performing spread spectrum communications based on a direct sequence spreading scheme, and is characterized in that the transmitter includes: a permuting processor for permuting the I-phase component signal and the Q-phase component signal of the transmission signal, once every two clock units and at the same time inverting the sign of one of the component signals; a multiplier for multiplying the signals output from the complex spreading portion by a pseudo-random sequence which is generated at a speed exceeding the symbol rate; a roll-off filter for waveform shaping; and a carrier modulator for performing carrier modulation of the signals having undergone waveform shaping, and that the receiver includes: a carrier demodulator for performing carrier demodulation of the received signal; a multiplier for multiplying the two types of signals output from the carrier demodulator by the pseudo-random sequence generated at the same speed as above; a permuting processor for permuting the signal multiplied by the pseudo-random sequence, once every two clock units and at the same time inverting the sign of the component signal which underwent sign inversion at the transmitter; and a phase-correcting portion for performing phase-correction so as to extract the I-phase and Q-phase components.

A sixth aspect of the invention is characterized in that the permuting processor includes: a multiplier for multiplying one of the component signals of the transmission signal by −1; and a switch which, based on a control signal of 1 and 0 appearing alternately, switches between the combination of the I-phase component signal and Q-phase component signal of the transmission signal and the combination of one component signal multiplied by −1 and the other component signal, and that the permuting inverse processor includes: a multiplier for multiplying the signal which was multiplied by the pseudo-random sequence by −1; a switch which, based on a control signal of 1 and 0 appearing alternately, switches between the combination of the signals which were multiplied by a pseudo-random sequence and the combination between the signal multiplied by −1 and the other signal multiplied by another pseudo-random sequence.

A seventh aspect of the invention is that the spectrum spread communication system defined in the fifth or sixth aspect, further includes: a mapping circuit disposed prior to the transmitter for mapping the multiplexed transmission signals to points on the I-Q plane.

An eighth aspect of the invention is characterized in that the mapping circuit maps each of the signals to the I-phase and Q-phase and independently sets the I-phase or Q-phase amplitude and symbol rate, if required.

A ninth aspect of the invention is characterized in that the mapping circuit has the mapping function of mapping, when a multiple number of data channels are needed to be allotted in response to an information transfer request arising regularly or eventually, the data onto the I-Q plane by using a multiple number of orthogonal sequences whereby increase in symbol rate due to mapping is minimized.

DETAILED DESCRIPTION OF EXAMPLE EMBODIMENTS

Next, the embodiments of the present invention will be described with reference to the drawings.

The First Embodiment

Figure 3:
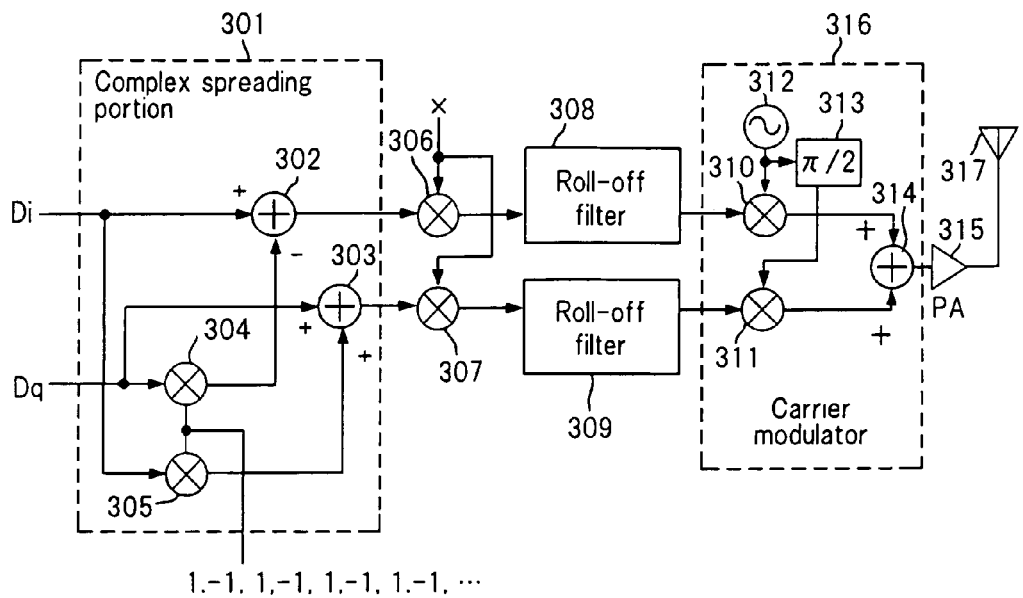
FIG. 3 is a block diagram showing the first embodiment of a spread spectrum communication system in accordance with the present invention, (a) and (b) being a transmitter and receiver, respectively.
Figure 3:
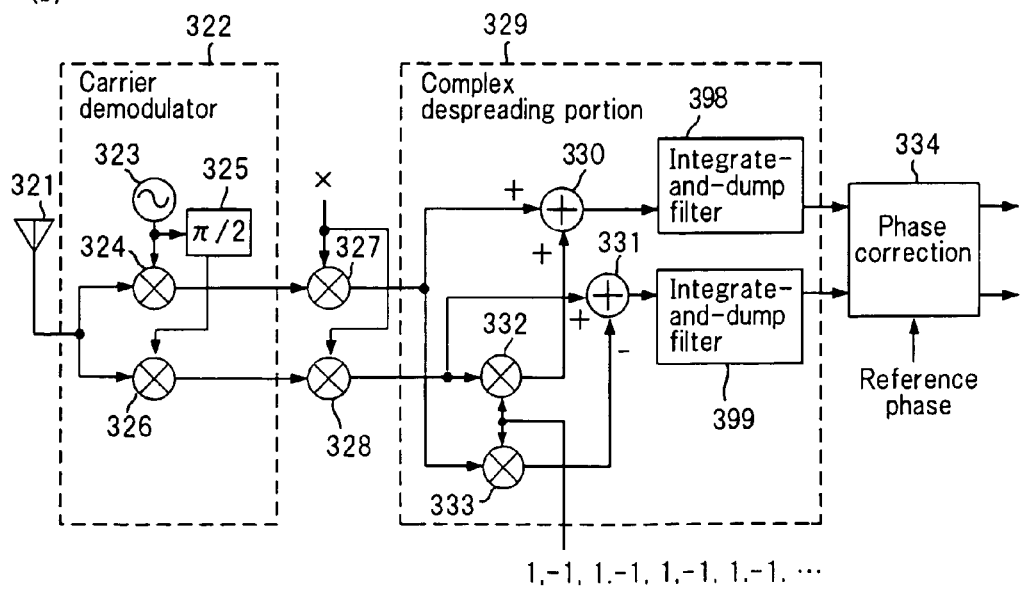

FIG. 3 is a block diagram showing the first embodiment of a spread spectrum communication system in accordance with the present invention, FIG. 3(a) and FIG. 3(b) showing a transmitter and receiver, respectively.

As shown in FIG. 3(a), the transmitter is comprised of a complex spreading portion 301 for performing complex spreading modulation of the I-phase and Q-phase data $D_i$ and $D_q$ of a transmission signal, multipliers 306 and 307 for scrambling the data with a pseudo-random sequence $PN^{(k)}$ which is generated at a speed equal to or above some times or some hundreds times of the symbol rate, roll-off filters 308 and 309 for waveform shaping, a carrier modulator 316, a power amplifier 315 and an antenna 317.

Complex spreading portion 301 includes a multiplier 305 for multiplying the I-phase data $D_i$ by a complex number sequence of 1 and −1 appearing alternately, a multiplier 304 for multiplying the Q-phase data $D_q$ by the above complex number sequence, an adder 302 for adding the modulated data through multiplier 304 to the I-phase data $D_i$ and an adder 303 for adding the modulated data through multiplier 305 to the Q-phase data $D_q$.

The data output from adder 302 is supplied to multiplier 306 and the data from adder 303 is supplied to multiplier 307.

Carrier modulator 316 includes a sinusoidal wave generating circuit 312, a phase-rotation circuit 313 for rotating the sinusoidal wave in phase by $\pi/2$ at the same speed as that at which pseudo-random sequence $PN^{(k)}$ is generated, a multiplier 310 for modulating the data having passed through roll-off filter 308 by the sinusoidal wave and a multiplier 311 for modulating the data having passed through roll-off filter 309 by the sinusoidal wave rotated in phase by $\pi/2$, and an adder 314 for performing addition of these modulated data.

First, the transmission signal is separated into the I-phase component and the Q-phase component, which are input to complex spreading portion 301. In complex spreading portion 301, the data is spread by a complex number sequence pattern of 1 and −1 appearing alternately through multipliers 304 and 305 and adders 302 and 303. Therefore, if no change occurs in data, the signal outputs from complex spreading portion 301 continuously change in phase by ±90 degrees.

The output from complex spreading portion 301 is modulated by pseudo-random sequences $PN^{(k)}$ (x) allotted to each user through multipliers 306 and 307. Then, the signal is wave-shaped through roll-off filters 308 and 309 so that the baseband signal is modulated by carrier modulator 316, so that the resulting signal is supplied to power amplifier 315, where it is amplified and transmitted from antenna 317.

As shown in FIG. 3(b), the receiver is comprised of an antenna 321, a carrier demodulator 322, multipliers 327 and 328 for demodulating the signal with pseudo-random sequence $PN^{(k)}(x)$, a complex despreading portion 329 for performing complex despreading and a phase rotating circuit 334 for performing phase correction based on the reference phase.

Carrier demodulator 322 includes a sinusoidal wave generating circuit 323, a phase rotating circuit 325 for rotating the sinusoidal wave in phase by $\pi/2$, a multiplier 324 for demodulating the received signal through antenna 321 by the sinusoidal wave and a multiplier 326 for demodulating the received signal through antenna 321 by the sinusoidal wave rotated in phase by $\pi/2$.

Multiplier 324 outputs the demodulated signal to multiplier 327.

Multiplier 326 outputs the demodulated signal to multiplier 328.

Complex despreading portion 329 including a multiplier 333 for multiplying the output signal from multiplier 327 by the complex number sequence, a multiplier 332 for multiplying the signal output from multiplier 328 by the complex number sequence, an adder 330 for adding the output signal from multiplier 332 to the signal output from multiplier 327, an adder 331 for adding the output signal from multiplier 333 to the signal output from multiplier 328 and integrate-and-dump filters 398 and 399 for performing waveform shaping of the signals received from adders 330 and 331.

On the receiver side, the signal after the demodulation through carrier demodulator 322 is multiplied with x, i.e., pseudo-random sequence $PN^{(k)}$, through multipliers 327 and 328. Then the signal is further despread through complex despreading portion 329 and is corrected in phase by phase rotating circuit 334 based on the reference phase information determined using a pilot symbol etc., whereby I-phase and Q-phase information is extracted.

Figure 1:
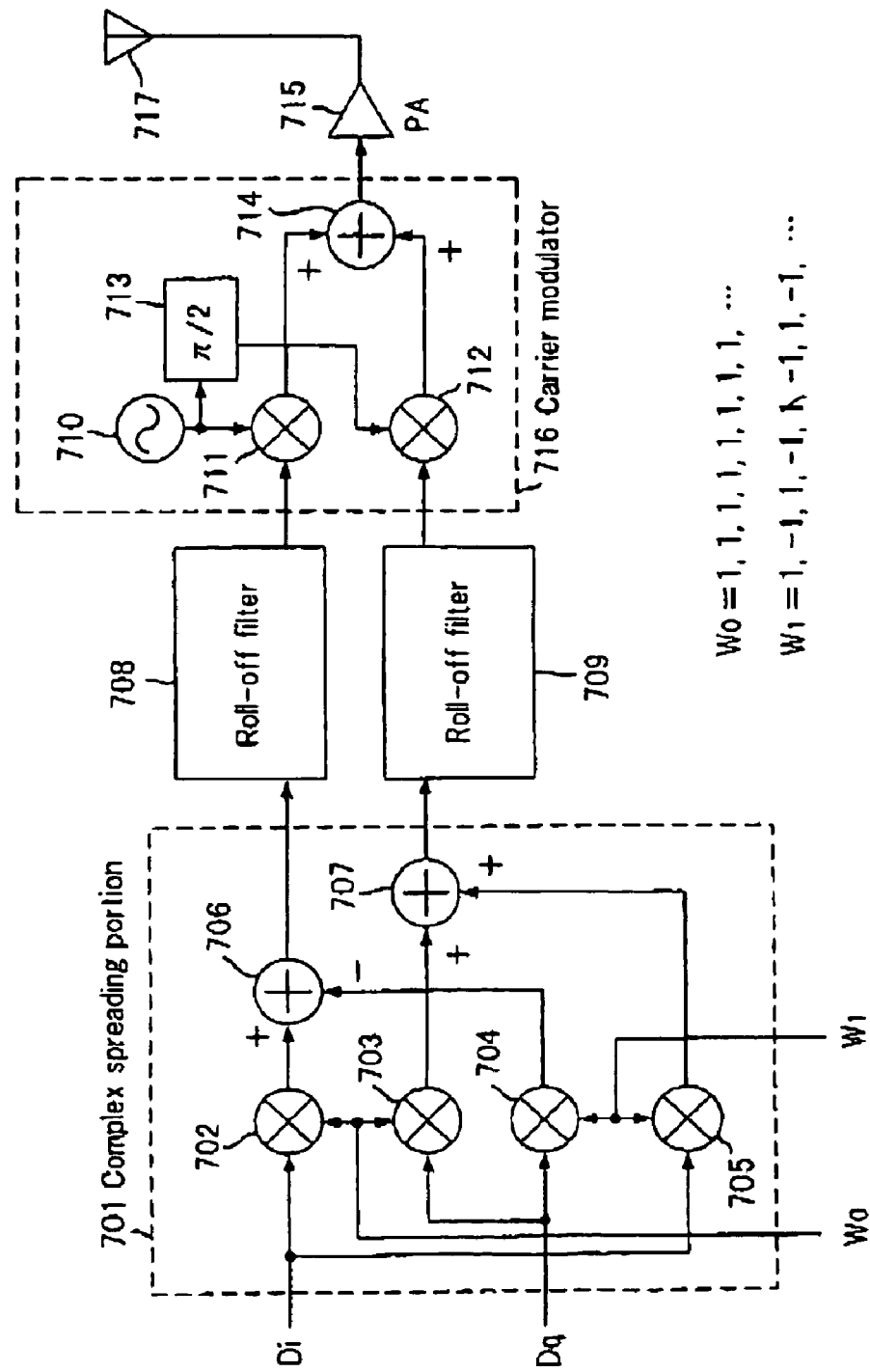
FIG. 1 is a block diagram showing a transmitter in a conventional QPSK spread spectrum communication system.
Figure 2:
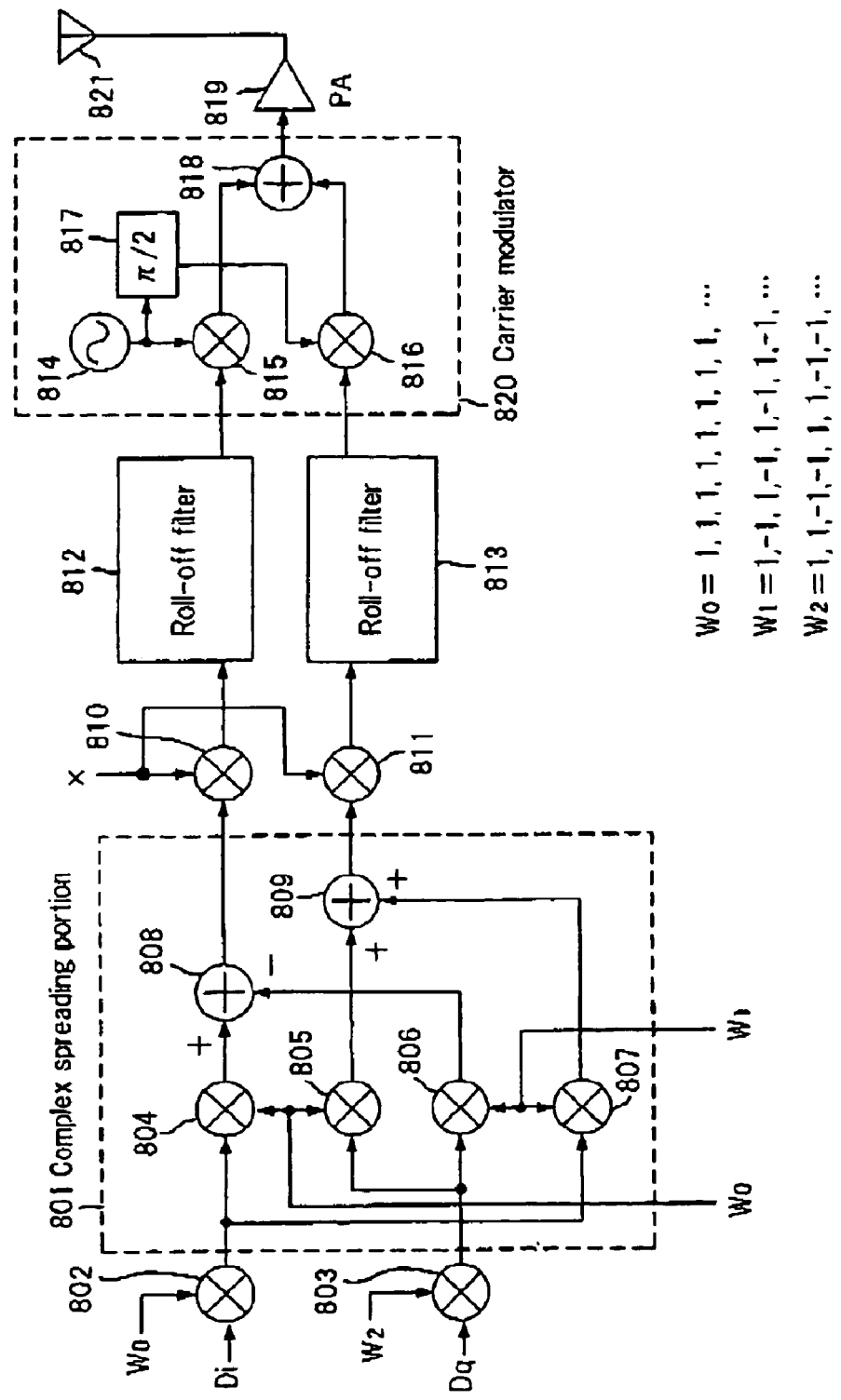
FIG. 2 is a block diagram showing a transmitter in a conventional OCQPSK spread spectrum communication system.
Figure 4:
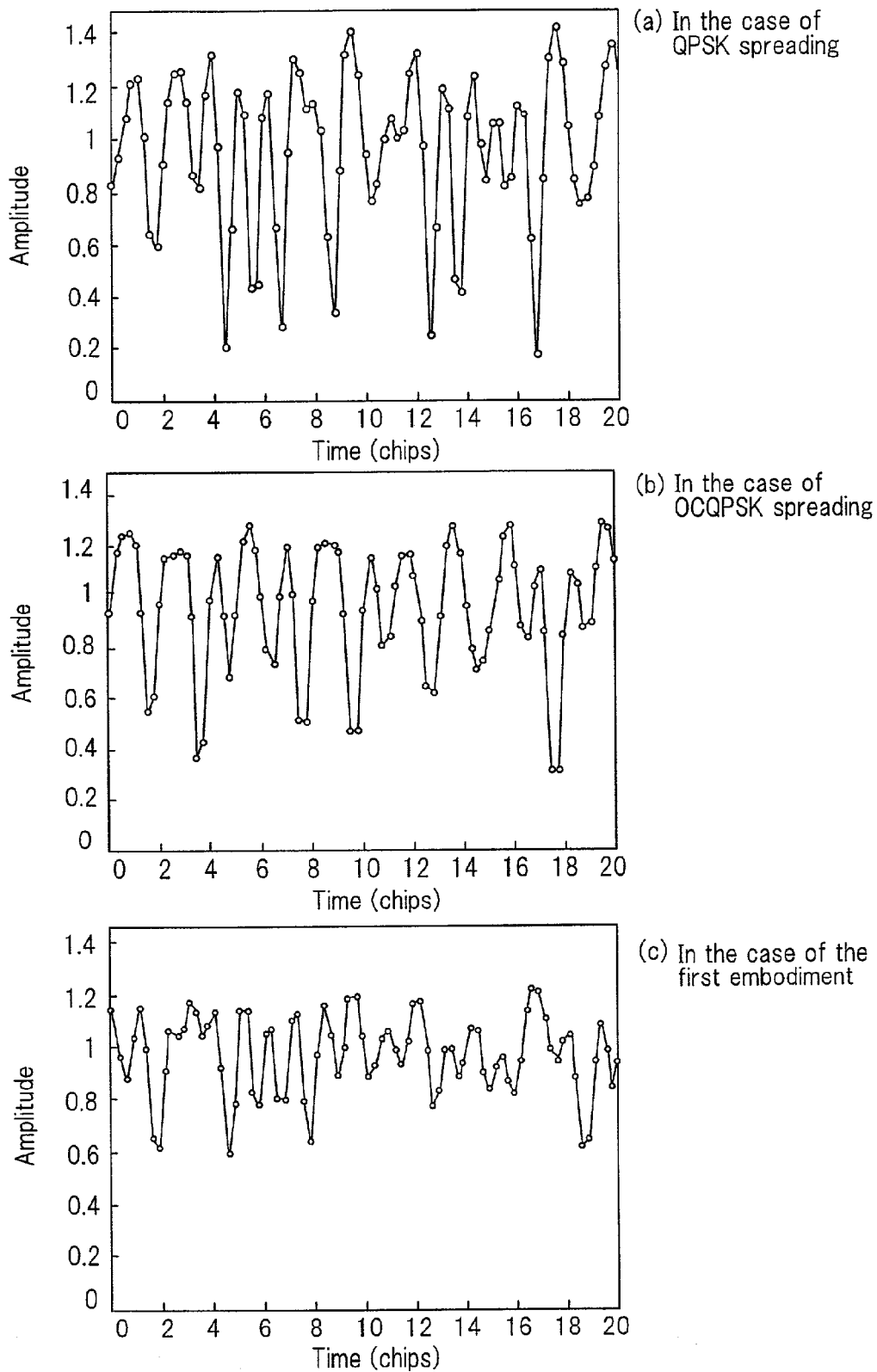
FIG. 4 shows characteristic charts representing time-dependent variations in amplitude of the signals having passed through roll-off filters, (a) for a typical QPSK system, (b) for OCQPSK system and (c) for a system of the first embodiment.

In this spread spectrum communication system, the data is spread using the complex number sequence pattern of 1 and −1 appearing alternately, instead of performing modulation by $W_0$ and $W_2$ prior to complex spreading portion 801 shown in FIG. 2, so that the signal output from complex spreading portion 301 will continuously change in phase by ±90 degrees as long as the data is constant. In this way, the signal input to complex spreading portion 301 is prevented to change at a rate greater than the symbol rate, whereby the effect of phase transition restriction can be enhanced. Thus, phase transition of the spread signal is restricted so as to reduce the amplitude variations of the signal, which makes it possible to alleviate the linearity requirement on the amplifier. An example of the time-dependent variation in amplitude of the signal having passed through the root roll-off filter having a roll-off factor of 0.22 is shown in FIG. 4.

The chart shown in FIG. 4(a) represents the characteristic of the amplitude variation of a signal which is spread modulated through a typical QPSK spread system and then passed through the root roll-off filter. In contrast, the FIG. 4(b) represents the case using the OCQPSK scheme and FIG. 4(c) represents the amplitude variation when the first embodiment is applied. The amplitude variation range of the OCQPSK scheme turned out to be smaller than that of the QPSK scheme. The first embodiment presented a further smaller variation range, proving improvement.

Figure 5:
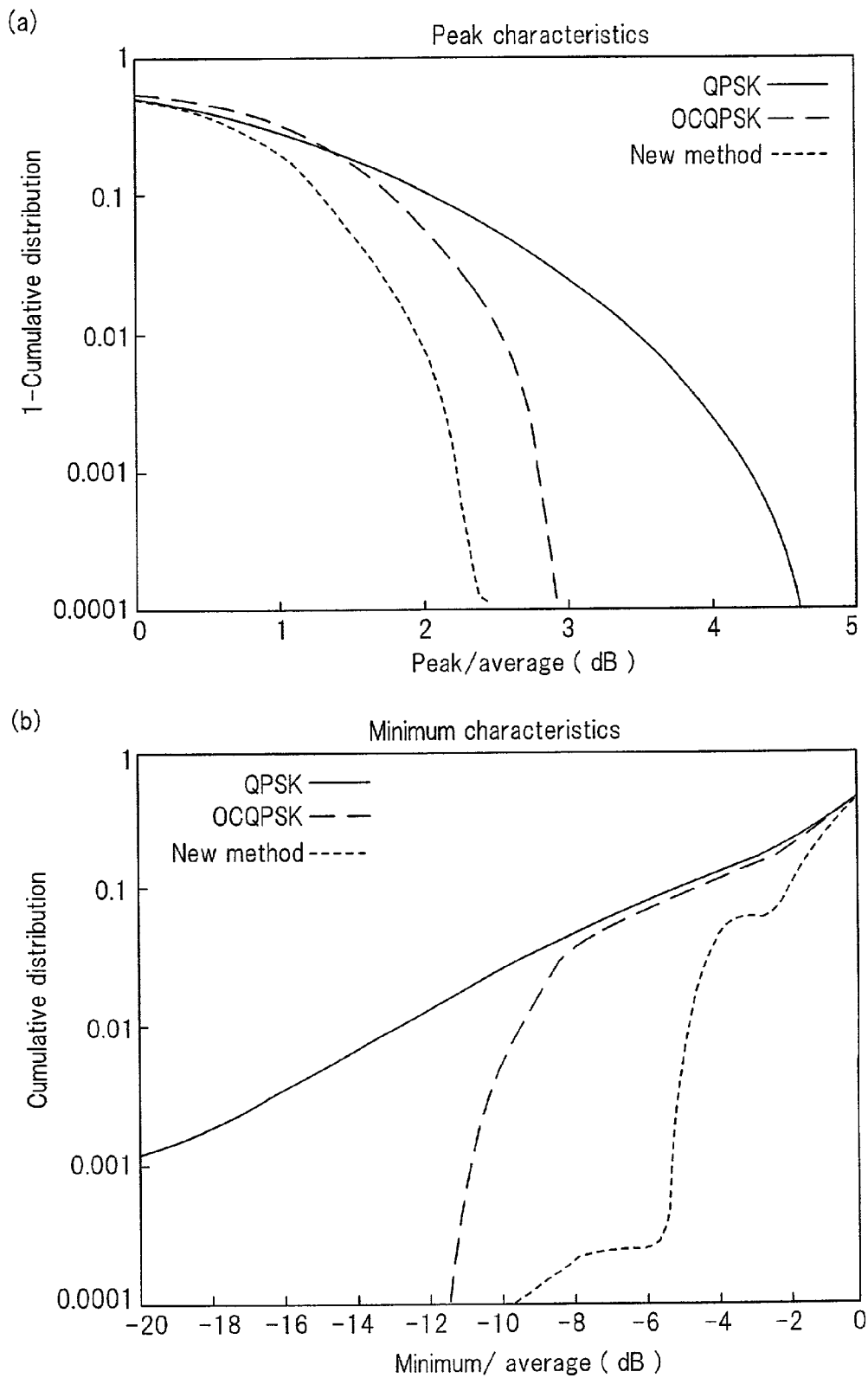
FIG. 5 shows characteristic charts representing the cumulative probability distribution of the instantaneous value of the roll-off filter output value, (a) representing the peak value distributions in the above systems and (b) representing the minimum value distributions.

FIG. 5 shows the cumulative probability distribution of the instantaneous value of the roll-off filter output value.

FIG. 5(a) represents the peak value distributions of the above systems and FIG. 5(b) represents the minimum value distributions. Since the present embodiment shows the lowest peak value and the largest minimum, it is understood that the amplitude variation range is the smallest compared to the other systems.

The Second Embodiment

Figure 6:
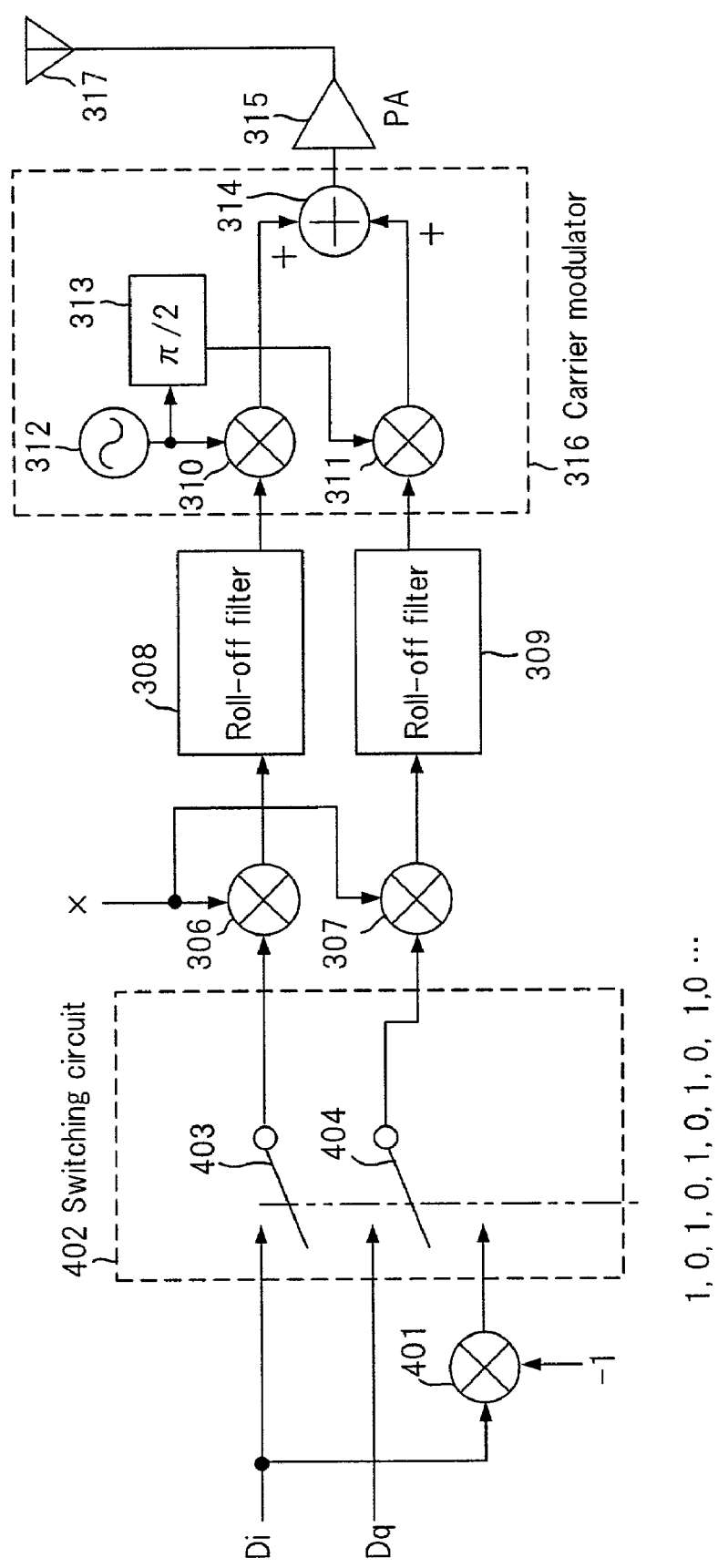
FIG. 6 is a block diagram showing the second embodiment of a spread spectrum communication system in accordance with the present invention.

FIG. 6 is a block diagram showing the second embodiment of a spread spectrum communication system in accordance with the present invention. This spread spectrum communication system represents its transmitter, which is comprised of a multiplier 401 for multiplying the I-phase data $D_i$ by $-1$ and a switching circuit 402, instead of the complex spreading portion 301 of the first embodiment. Other components are the same as in the first embodiment so the same reference numerals as in the first embodiment are allotted. Switching circuit 402 has switches 403 and 404 controlled in accordance with a control signal.

The transmission signal is separated into the I-phase and Q-phase components and input to switching circuit 402. The I-phase component is processed through multiplier 401 so as to continuously generate its negative-phase signal, which is also supplied to switching circuit 402.

Figure 7:
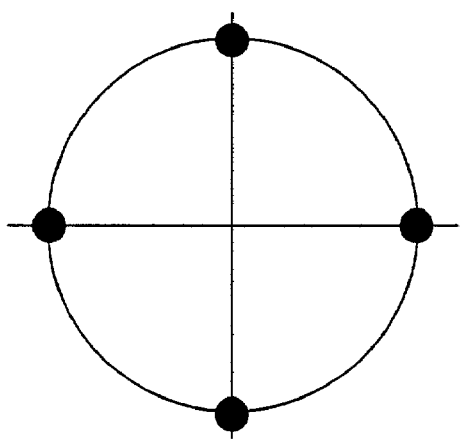
FIG. 7 shows illustrative diagrams representing the allocations of the signal points according to the first and second embodiments.
Figure 7:
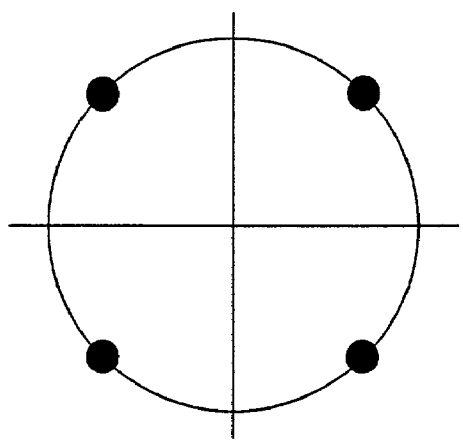

Two switches 403 and 404 in switching circuit 402 are adapted to operate in accordance with a control signal. When a signal which alternately changes between 0 and 1, namely once ever two clock units, is supplied as the control signal, the inputs are directly output for even-numbered chips and the inputs $D_i$ and $D_q$ are permuted for odd-numbered chips. For the latter case, the sip of data $D_i$ is inverted by multiplier 401 and input The output from switching circuit 402 is always shifted in phase by 45 degrees relative to that of the first embodiment (see FIG. 7). Also in this case, the signal continuously changes in phase by 90 degrees if no change occurs in data, so that the same effect as in the first embodiment can be obtained.

The other operation is the same as the first embodiment. Here, no receiver is shown but the switching circuit is configured so as to perform reverse operations of the transmitter and the same configuration as in the first embodiment can be employed for the other parts.

The Third Embodiment

Figure 8:
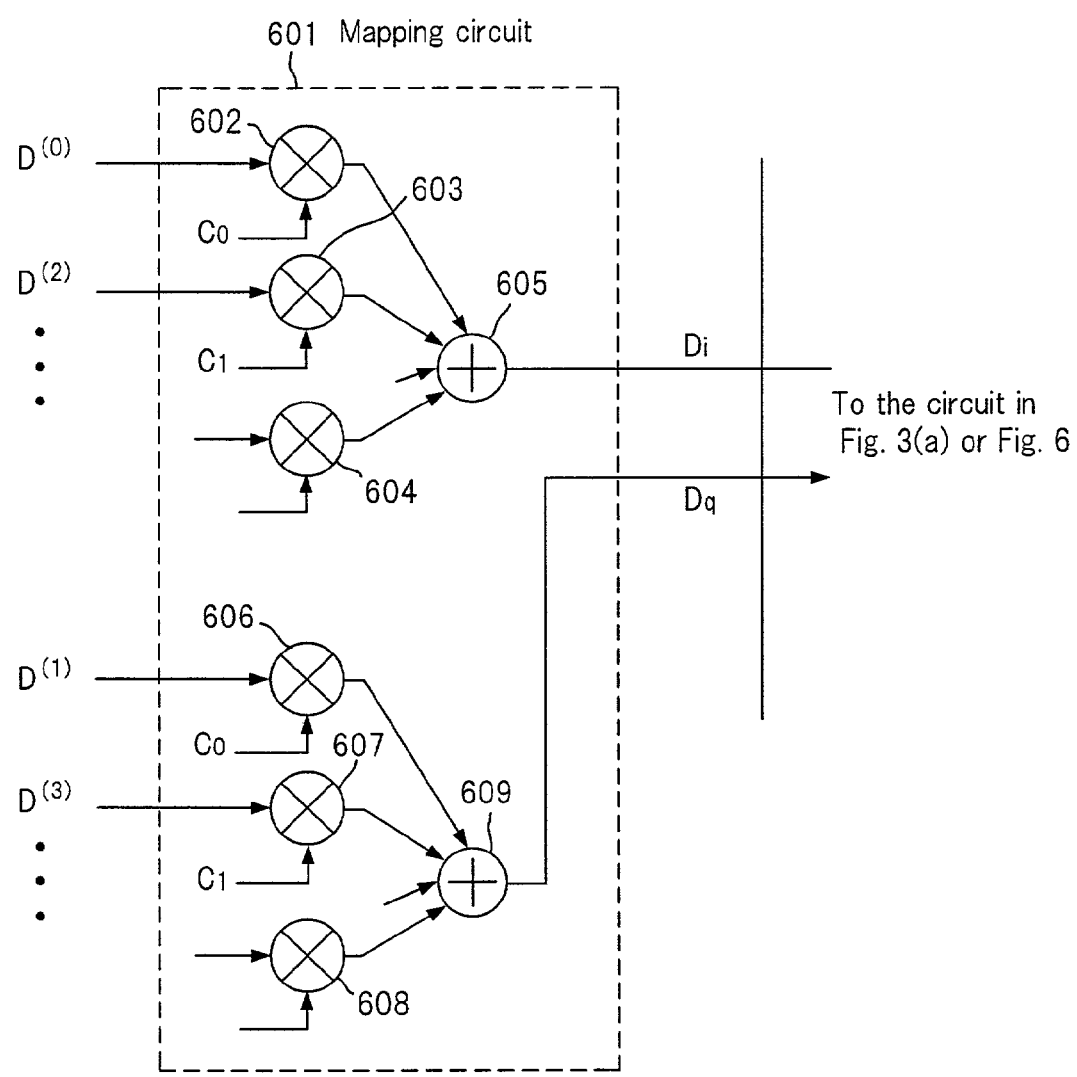
FIG. 8 is a block diagram showing the third embodiment of a spread spectrum communication system in accordance with the present invention.

FIG. 8 is a block diagram showing the third embodiment of a spread spectrum communication system in accordance with the present invention, in which a mapping circuit to be disposed prior to the transmitter shown in FIG. 3(a) or FIG. 6 is shown. In the first and second embodiments, data is allotted for I-phase and Q-phase components as transmission data $D_i$ and $D_q$. However, for multimedia communications to which W-CDMA is expected to be applied, in order to flexibly deal with various data rates, multi-rate transmission, multi-code transmission and the like are desired.

FIG. 8 shows a mapping circuit 601 for generating the symbol which is the combination of parallel input data $D^{(0)}$, $D^{(1)}, D^{(2)}, \ldots D^{(N-1)}$ and input to the transmitter in FIG. 3(a) or FIG. 6.

Mapping circuit 601 is configured of multiple multipliers 603 to 604, 606 to 608, . . . , multiple adders 605, 609, . . . , and circuits for generating orthogonal codes $C_n$. Here, a value $2^i$ satisfying the condition $2^{i-1} < [N/2] \leq 2^i$ is determined, where [x] denotes a minimum integer equal to or greater than x.

Under this condition, the symbol rate of the output from mapping circuit 601 becomes equal to $2^i$ times of the largest symbol rate of the input to mapping circuit 601. For symbol mapping, arbitrary orthogonal codes can be used. As an example, Walsh-Hadamard sequences can be used. Now, a specific example will be shown. $D^{(0)}$ is assumed as a control channel and $D^{(1)}$, $D^{(2)}$ and $D^{(3)}$ are assumed as data channels. The symbol rate of the control channel is 1/256 of the chip rate and the data channel is 1/32.

In this case, it is assumed that $C_0=1, 1$ and $C_1=1, -1$, so that the outputs from mapping circuit 601 are obtained as follows:

$$D_i = D^{(0)} \cdot C_0 + D^{(2)} \cdot C_1$$

$$D_q = D^{(1)} \cdot C_0 + D^{(3)} \cdot C_1.$$

For this case, the clock for $C_0$ and $C_1$ becomes equal to twice of that of $D^{(1)}$, $D^{(2)}$ and $D^{(3)}$. Thus, one control channel and three data channels can be mapped to generate a symbol having a speed one-sixteenth of the chip rate. This symbol is input to the circuit shown in FIG. 3(a) or FIG. 6 and is transmitted. In this way, use of such a mapping circuit makes it possible for a single transmitter to send data involving a multiple pieces of information different in transmission rate and in required quality. The information can be demodulated using one or multiple receivers.

According to the present invention, the signals (information symbols arranged at symbol points) arranged on the I-Q plane are subjected to spectrum spreading using complex number sequences devised so as not to cause phase-transition in a diagonal line direction (toward the origin point), whereby it is possible to reduce the amplitude variation of the signal after roll-off filters and hence narrow the signal dynamic range, which allows a relatively low-cost high efficiency amplifier to satisfy the system specifications as to adjacent channel interface etc. As a result, this invention contributes to reducing the cost of the system and to reducing the power consumption.

Further, use of a mapping circuit makes it possible for a single transmitter to send data involving a multiple pieces of information different in transmission rate and in required quality.

INDUSTRIAL APPLICABILITY

As has been described heretofore, the spread spectrum communication system according to the present invention is applicable to spread spectrum communication systems of a direct sequence spreading type which is used for portable phones, mobile communication systems and the like. Further, the invention contributes to miniaturization, power saving and cost reduction of the transmitter.

What is claimed is:

1. A spread spectrum communication system including a transmitter and receiver for performing spread spectrum communications based on a direct sequence spreading scheme, the transmitter comprising:
a complex spreading portion for multiplying an I-phase component signal and a Q-phase component signal of a transmission signal by a complex number sequence which will not cause any phase transition of signals on an I-Q plane in a direction toward the origin thereof;
a multiplier for multiplying signals output from the complex spreading portion by a pseudo-random sequence which is generated at a speed exceeding a symbol rate of the transmission signal;

a roll-off filter for waveform shaping; and a carrier modulator for performing carrier modulation of signals having undergone waveform shaping, the receiver comprising:

a carrier demodulator for performing carrier demodulation of a signal received from the transmitter;

a multiplier for multiplying signals of two types output from the carrier demodulator by the pseudo-random sequence;

a complex despreading portion for performing despreading by multiplying the signals of each type by the complex number sequence; and a phase-correcting portion for performing phase-correction so as to extract the I-phase and Q-phase components, wherein the complex number sequence is a pattern by which the I-phase component is constantly set at 1 or −1 and the Q-phase component changes between 1 and −1 alternately.

2. The spectrum spread communication system according to claim 1, wherein the complex spreading portion includes:

a multiplier for multiplying the I-phase component signal and the Q-phase component signal of the transmission signal by the complex number sequence, and an adder for performing addition of the I-phase component signal and the Q-phase component signal of the transmission signal respectively to the Q-phase component signal and the I-phase component signal multiplied by the complex number sequence, respectively; and the complex despreading portion includes:

a multiplier for multiplying the signals of each type by the complex number sequence, and an adder for performing addition of the signals of each type to the signals of each type multiplied by the complex number sequence, respectively.

3. The spectrum spread communication system according to claim 1, further comprising:

a mapping circuit disposed prior to the transmitter for mapping data input thereto to points on the I-Q plane.

4. The spread spectrum communication system according to claim 1, wherein the pattern is represented by $(1+(-1)^k j)$ or $(-1+(-1)^k j)(k=0, 1, 2, \ldots, j$ is the imaginary unit).

5. A spread spectrum communication system including a transmitter and receiver for performing spread spectrum communications based on a direct sequence spreading scheme, the transmitter comprising:

a permuting processor for permuting an I-phase component signal and a Q-phase component signal of a transmission signal once every two clock units and, at the same time, inverting the sign of one of the I-phase and Q-phase component signals;

a multiplier for multiplying signals output from the permuting processor by a pseudo-random sequence which is generated at a speed exceeding a symbol rate of the transmission signal;

a roll-off filter for waveform shaping; and a carrier modulator for performing carrier modulation of signals having undergone waveform shaping, the receiver comprising:

a carrier demodulator for performing carrier demodulation of a received signal; and a multiplier for multiplying two types of signals output from the carrier demodulator by the pseudo-random sequence.

6. The spectrum spread communication system according to claim 5, wherein the permuting processor of the transmitter includes:

a multiplier for multiplying one of the component signals of the transmission signal by −1; and a switch which, based on a control signal of 1 and 0 appearing alternately, switches between a combination of the I-phase component signal and the Q-phase component signal of the transmission signal and a combination of the one component signal multiplied by −1 and the other component signal.

7. The spectrum spread communication system according to claim 5, further comprising:

a mapping circuit disposed prior to the transmitter for mapping data input thereto to points on the I-Q plane.

8. The spectrum spread communication system according to claim 7, wherein the mapping circuit maps the data to the I-phase and Q-phase and independently sets the I-phase or Q-phase amplitude and the symbol rate, if required.

9. The spectrum spread communication system according to claim 7, wherein the mapping circuit has the mapping function of mapping, when a multiple number of data channels are needed to be allotted in response to an information transfer request arising regularly or eventually, the data onto the I-Q plane by using a multiple number of orthogonal sequences, whereby increase in symbol rate due to mapping is minimized.

10. A spread spectrum communication apparatus for performing spread spectrum communications based on a direct spreading scheme, comprising:

a complex spreading portion for multiplying an I-phase component signal and a Q-phase component signal of a transmission signal by a complex number sequence;

a multiplier for multiplying the signals output from the complex spreading portion by a pseudo-random sequence which is generated at a speed exceeding a symbol rate of the transmission signal;

a roll-off filter for waveform shaping; and a carrier modulator for performing carrier modulation of signals having undergone waveform shaping, wherein the complex number sequence is a pattern by which the I-phase component is constantly set at 1 or −1 and the Q-phase component changes between 1 and −1 alternately.

11. The spectrum spread communication apparatus according to claim 10, wherein the complex spreading portion includes:

a multiplier for multiplying the I-phase component signal and the Q-phase component signal of the transmission signal by the complex number sequence, and an adder for performing addition of the I-phase component signal and the Q-phase component signal of the transmission signal respectively to the Q-phase component signal and the I-phase component signal multiplied by the complex number sequence.

12. The spread spectrum communication apparatus according to claim 10, wherein the pattern is represented by $(1+(-1)^k j)$ or $(-1+(-1)^k j)(k=0, 1, 2, \ldots, j$ is the imaginary unit).

13. The spread spectrum communication apparatus according to claim 10, further comprising:

a mapping circuit disposed prior to the complex spreading portion for mapping data input thereto to points on the I-Q plane.

14. A spread spectrum communication apparatus for performing spread spectrum communications based on a direct sequence spreading scheme, comprising:

a permuting processor for permuting an I-phase component signal and a Q-phase component signal of a transmission signal once every two clock units and, at the same time, inverting the sign of one of the I-phase and Q-phase component signals;

a multiplier for multiplying signals output from the permuting processor by a pseudo-random sequence which is generated at a speed exceeding a symbol rate of the transmission signal;

a roll-off filter for waveform shaping; and a carrier modulator for performing carrier modulation of signals having undergone waveform shaping.

15. The spread spectrum communication apparatus according to claim 14, wherein the permuting processor includes:

a multiplier for multiplying the one of the I-phase and Q-phase component signals of the transmission signal by −1; and a switch which, based on a control signal of 1 and 0 appearing alternately, switches between a combination of the I-phase component signal and the Q-phase component signal of the transmission signal and a combination of the one component signal multiplied by −1 and the other component signal.

16. The spread spectrum communication apparatus according to claim 14, further comprising:

a mapping circuit disposed prior to the permuting processor for mapping data input thereto to points on the I-Q plane.

17. The spread spectrum communication apparatus according to claim 16, wherein the mapping circuit maps the data to the I-phase and Q-phase and independently sets the I-phase and Q-phase amplitude and the symbol rate, if required.

18. The spread spectrum communication apparatus according to claim 16, wherein the mapping circuit has the mapping function of mapping, when a multiple number of data channels are needed to be allotted in response to an information transfer request arising regularly or eventually, the data onto the I-Q plane by using a multiple number of orthogonal sequences whereby increase in symbol rate due to mapping is minimized.

19. A spread spectrum communication apparatus for performing spread spectrum communications based on a direct sequence spreading scheme, comprising:

a carrier demodulator for performing carrier demodulation of a received signal;

a multiplier for multiplying signals of two types output from the carrier demodulator by a pseudo-random sequence generated at a speed exceeding a symbol rate of the received signal;

a complex despreading portion for performing despreading by multiplying the signals of each type by a complex number sequence; and a phase-correcting portion for performing phase-correction so as to extract I-phase and Q-phase components, wherein the complex number sequence is a pattern by which the I-phase component is constantly set at 1 or −1 and the Q-phase component changes between 1 and −1 alternately.

20. The spread spectrum communication apparatus according to claim 19, wherein the complex despreading portion includes:

a multiplier for multiplying the signals of each type by the complex number sequence, and an adder for performing addition of the signals of each type to the signals of each type multiplied by the complex number sequence, respectively.

21. The spread spectrum communication apparatus according to claim 19, wherein the pattern is represented by $(1+(-1)^k j)$ or $(-1+(-1)^k j)$ ($k=0, 1, 2, \ldots$, j is the imaginary unit).

* * * * *